Nov. 3, 1931. L. C. MOORE ET AL Re. 18,242
METHOD OF REMOVING PAINT, ENAMEL, ETC
Original Filed Aug. 5, 1919
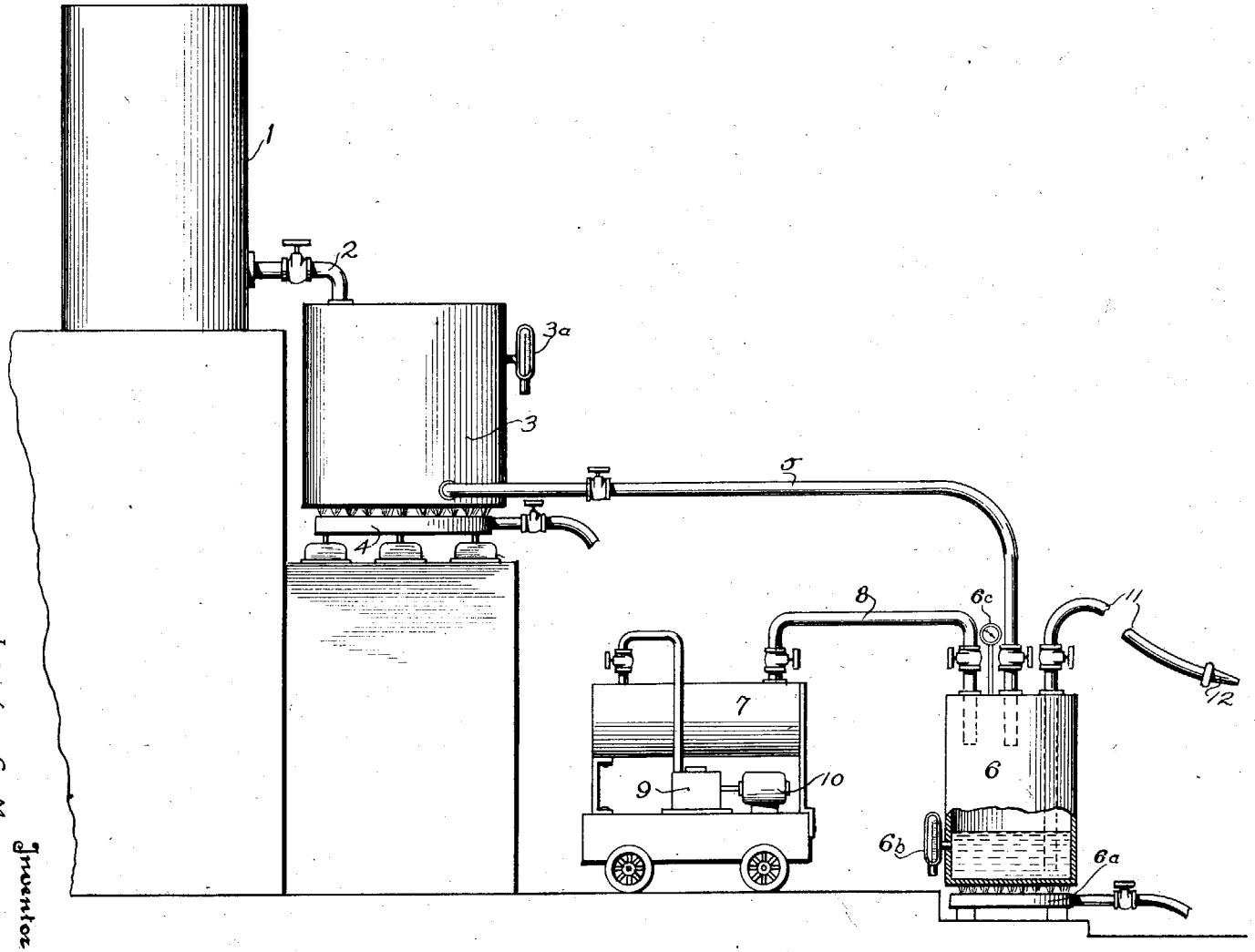
Inventor
Landon C. Moore
William T. Jackson
By Ch. Parker Attorney Reissued Nov. 3, 1931

Re. 18,242

UNITED STATES PATENT OFFICE

LANDON C. MOORE, OF DALLAS, AND WILLIAM T. JACKSON, OF SAN ANTONIO, TEXAS, ASSIGNORS, BY DIRECT AND MESNE ASSIGNMENTS, TO THE MOORE PROCESS CHEMICAL CO., OF DALLAS, TEXAS, A COMMON-LAW COMPANY

METHOD OF REMOVING PAINT, ENAMEL, ETC.

Original No. 1,476,909, dated December 11, 1923, Serial No. 315,380, filed August 5, 1919. Application for reissue filed September 18, 1925. Serial No. 57,235.

Our invention relates to certain new and useful improvements in method of removing paint, enamel, varnish, and such like compositions, and while obviously it is applicable to the removal of paint, etc., from all objects, nevertheless, it is particularly directed to the removal of paint, varnish, etc., from automobile bodies and associated parts.

The primary object of the invention is to provide a process which will effectively and expeditiously remove these compositions by the use of a solution which attacks the paint or enamel and which is impacted against the latter by a fluid under pressure so as to practically effect cutting of and disintegration and removal of the paint, enamel or whatever the composition to be removed might be in a simple and quick operation.

In the drawing, the figure is an elevation of one form of an apparatus by which the process is carried into practice.

In proceeding in accordance with the present invention, the apparatus preferably employed embodies a tank 1, in which the solution is stored composed of any of the alkalies, such as caustic soda, caustic potash, or soda ash, mixed with soap or soap powder and with either hot or cold water. A valved connection 2 leads from tank 1 to a tank 3, the tank 3 being supplied with a thermometer 3*a* for indicating the temperature of the solution which should be at least 212° F., or at a boiling point, before leaving the tank, the tank being subject to the heating action of a gas heater 4, or equivalent. A valved connection 5 leads from tank 3 and delivers into a compressed air tank 6, the several tanks being preferably arranged so that the solution will gravitate from 1 to 3 and from the latter into 6. This, however, is optional. The tank 6 derives its compressed air from an air storage tank 7 through a valved connection 8 and in turn receives its supply of air from a compressed air pump 9 driven by a motor 10. Under the tank 6 is arranged a heater 6*a* similar to heater 4, by means of which the solution may be still further heated while under pressure of the air to say 350° F. if necessary, such application of the heat while the solution is under pressure allowing a much higher temperature to be attained than would be possible without such pressure. A flexible hose or the like 11 leads from the compressed air tank 6 and is equipped with a sprayer or nozzle 12 at its outer end. A temperature gage 6*b* for the solution and a pressure gage 6*c* for the air pressure are provided, the air pressure normally being maintained at from 50 to 100 pounds.

Assuming an automobile body is to have paint, enamel, or such like removed therefrom, the same is brought into proximity to the hose and solution from tank 1 is permitted to gravitate into tank 3 where, under the influence of the heat from the heater 4, its temperature will be raised to at least boiling point, or 212° F., until the solution is sufficiently hot. The valves in connection 5 are then opened, thus permitting the solution to gravitate into tank 6 where it seeks the bottom of the tank in a still heated state. The valves of connection 5 are now closed and those of connection 8 opened, allowing the compressed air to enter the tank 6 and acting upon the hot solution therein contained, forces the latter through the flexible hose 11, through which it egresses and is sprayed onto the paint of the object being operated upon. Where the paint or composition is very tenacious or difficult of removal, the heater 6*a* may be utilized. For ordinary purposes, however, the heater 4 is sufficient, but the heater 6*a* may be used without heater 4, and vice versa.

The solution is thus impacted under considerable pressure against the paint and first acts to soften the paint and then washes it from the surface.

The apparatus shown is merely by way of example and the compressed fluid employed is to be considered as comprehending all fluids suitable for the purpose.

Having thus described our invention, we claim:

1. The herein described process of removing paint, enamel, varnish or similar coating composition from finished surfaces which comprises heating in a closed container a substantially non-volatile, fixed alkali solution adapted to soften surface coating compositions to a temperature of at least 212° F., and forcibly impacting a jet of the heated solution against a surface to be cleaned by subjecting the surface of said solution in said container to an aeriform fluid under a pressure of at least fifty pounds per square inch, said jet being discharged from its delivering agency substantially unintermingled with an aeriform fluid.

2. The herein described process of removing paint, enamel, varnish or similar coating composition from finished surfaces which comprises heating in a closed container a substantialy non-volatile, fixed alkali solution adapted to soften surface coating compositions to a temperature of at least 212° F., and forcibly impacting a jet of the heated solution against a surface to be cleaned by subjecting the surface of said solution in said container to air under pressure of from fifty to one hundred pounds per square inch, said jet being discharged from its delivering agency substantially unintermingled with an aeriform fluid.

3. The herein described process of removing paint, enamel, varnish or similar coating composition from finished surfaces which comprises heating a relatively large quantity of a substantially non-volatile, fixed alkali solution adapted to soften surface coating compositions, intermittently withdrawing portions of said solution into a closed container, heating said withdrawn portions to a temperature of at least 212° F., and forcibly impacting under a pressure of at least 50 pounds per square inch against a surface to be cleaned a jet of said solution from said container.

In testimony whereof, we affix our signatures.

LANDON C. MOORE.
WILLIAM T. JACKSON.